US012794617B2

(12) United States Patent
Hu et al.

(10) Patent No.: US 12,794,617 B2
(45) **Date of Patent: *Nov. 10, 2026**

(54) CENTER RU996 TONE PLAN DESIGNS FOR WIDE BANDWIDTH 240MHz IN WIRELESS COMMUNICATIONS

(71) Applicant: MediaTek Inc., Hsinchu City (TW)

(72) Inventors: Shengquan Hu, San Jose, CA (US); Ching-Wen Hsiao, Hsinchu City (TW); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 429 days.

This patent is subject to a terminal disclaimer.

(21) Appl. No.: 18/376,697

(22) Filed: Oct. 4, 2023

(65) Prior Publication Data

US 2024/0129081 A1 Apr. 18, 2024

Related U.S. Application Data

(60) Provisional application No. 63/379,154, filed on Oct. 12, 2022.

(51) Int. Cl.
*H04L 5/00* (2006.01)

(52) U.S. Cl.
CPC .......... *H04L 5/0044* (2013.01); *H04L 5/0094* (2013.01)

(58) Field of Classification Search
CPC ... H04L 5/0044; H04L 5/0094; H04L 5/0037; H04L 5/001
See application file for complete search history.

(56) References Cited

U.S. PATENT DOCUMENTS

| | | | | |
|---|---|---|---|---|
| 12,452,118 | B2 * | 10/2025 | Hu | H04L 5/0007 |
| 2019/0253296 | A1 * | 8/2019 | Chen | H04L 27/26025 |
| 2019/0281614 | A1 * | 9/2019 | Chen | H04L 5/0007 |
| 2021/0274484 | A1 * | 9/2021 | Park | H04W 72/0453 |
| 2022/0070866 | A1 | 3/2022 | Park et al. | |
| 2025/0310162 | A1 * | 10/2025 | Hu | H04L 27/2602 |

OTHER PUBLICATIONS

IEEE, "IEEE Standard for Information Technology—Telecommunications and Information Exchange between Systems Local and Metropolitan Area Networks—Specific Requirements Part 11: Wireless LAN Medium Access Control", IEEE Std 802.11ax-2021 (Year: 2021).*

European Patent Office, Extended European Search Report in European Patent Application No. 23202998.3-1213, Apr. 3, 2024.

* cited by examiner

*Primary Examiner* — Justin T Van Roie

(74) *Attorney, Agent, or Firm* — Andy M. Han; Han IP PLLC

(57) ABSTRACT

Various schemes pertaining to center 996-tone resource unit (RU996) tone plan designs for wide bandwidth 240 MHz in wireless communications are described. A communication entity generates at least one 996-tone resource unit (RU996). The communication entity then communicates wirelessly using the at least one RU996 in a 240 MHz bandwidth. The at least one RU996 includes a center RU996 that is centered around five or more direct-current (DC) tones.

20 Claims, 19 Drawing Sheets

200

300

500

800

| RU type | RU index and subcarrier range | | |
|---|---|---|---|
| 996-tone RU | RU1 [-1524:-1027, -1021:-524] | RU2 [-500:-3, 3:500] | RU3 [524:1021, 1027:1524] |
| 3x996-tone RU | RU1 [-1524:-1027, -1021:-524, -500:-3, 3:500,524:1021, 1027:1524] | | |

FIG. 8

900

| RU type | RU index and subcarrier range | | |
|---|---|---|---|
| 996-tone RU | RU1<br>[-1524:-1027, -1021:-524] | RU2<br>[-501:-4, 4:501] | RU3<br>[524:1021, 1027:1524] |
| 3x996-tone RU | RU1<br>[-1524:-1027, -1021:-524, -501:-4, 4:501,524:1021, 1027:1524] | | |

FIG. 9

1000

| RU type | RU index and subcarrier range | | |
|---|---|---|---|
| 996-tone RU | RU1 [-1524:-1027, -1021:-524] | RU2 [-502:-5, 5:502] | RU3 [524:1021, 1027:1524] |
| 3x996-tone RU | RU1 [-1524:-1027, -1021:-524, -502:-5, 5:502,524:1021, 1027:1524] | | |

FIG. 10

1100

| RU type | RU index and subcarrier range | | |
|---|---|---|---|
| 996-tone RU | RU1<br>[-1524:-1027, -1021:-524] | RU2<br>[-503:-6, 6:503] | RU3<br>[524:1021, 1027:1524] |
| 3x996-tone RU | RU1<br>[-1524:-1027, -1021:-524, -503:-6, 6:503,524:1021, 1027:1524] | | |

FIG. 11

1200

| RU type | RU index and subcarrier range | | |
|---|---|---|---|
| 996-tone RU | RU1<br>[-1524:-1027, -1021:-524] | RU2<br>[-504:-7, 7:504] | RU3<br>[524:1021, 1027:1524] |
| 3x996-tone RU | RU1<br>[-1524:-1027, -1021:-524, -504:-7, 7:504,524:1021, 1027:1524] | | |

FIG. 12

1300

| RU type | RU index and subcarrier range | | |
|---|---|---|---|
| 996-tone RU | RU1<br>[-1524:-1027, -1021:-524] | RU2<br>[-505:-8, 8:505] | RU3<br>[524:1021, 1027:1524] |
| 3x996-tone RU | RU1<br>[-1524:-1027, -1021:-524, -505:-8, 8:505,524:1021, 1027:1524] | | |

FIG. 13

1400

| RU type | RU index and subcarrier range | | |
|---|---|---|---|
| 996-tone RU | RU1<br>[-1524:-1027, -1021:-524] | RU2<br>[-506:-9, 9:506] | RU3<br>[524:1021, 1027:1524] |
| 3x996-tone RU | RU1<br>[-1524:-1027, -1021:-524, -506:-9, 9:506,524:1021, 1027:1524] | | |

FIG. 14

1500

| RU type | RU index and subcarrier range | | |
|---|---|---|---|
| 996-tone RU | RU1 [-1524:-1027, -1021:-524] | RU2 [-507:-10, 10:507] | RU3 [524:1021, 1027:1524] |
| 3x996-tone RU | RU1 [-1524:-1027, -1021:-524, -507:-10, 10:507,524:1021, 1027:1524] | | |

FIG. 15

1600

| RU type | RU index and subcarrier range | | |
|---|---|---|---|
| 996-tone RU | RU1 [-1524:-1027, -1021:-524] | RU2 [-508:-11, 11:508] | RU3 [524:1021, 1027:1524] |
| 3x996-tone RU | RU1 [-1524:-1027, -1021:-524, -508:-11, 11:508,524:1021, 1027:1524] | | |

FIG. 16

1700

| RU type | RU index and subcarrier range | | |
|---|---|---|---|
| 996-tone RU | RU1 [-1524:-1027, -1021:-524] | RU2 [-509:-12, 12:509] | RU3 [524:1021, 1027:1524] |
| 3x996-tone RU | RU1 [-1524:-1027, -1021:-524, -509:-12, 12:509,524:1021, 1027:1524] | | |

FIG. 17

CENTER RU996 TONE PLAN DESIGNS FOR WIDE BANDWIDTH 240MHz IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/379,154, filed 12 Oct. 2022, the content of which being incorporated by reference in its entirety.

TECHNICAL FIELD

The present disclosure is generally related to wireless communications and, more particularly, to center 996-tone resource unit (RU996) tone plan designs for wide bandwidth 240 MHz in wireless communications.

BACKGROUND

Unless otherwise indicated herein, approaches described in this section are not prior art to the claims listed below and are not admitted as prior art by inclusion in this section.

In wireless communications, such as Wi-Fi (or WiFi) and wireless local area network (WLAN) under one or more Institute of Electrical and Electronics Engineers (IEEE) specifications, one of the main objectives for next-generation Wi-Fi is support of higher throughput. Accordingly, wider bandwidths, such as 240 MHz, 480 MHz and 640 MHz, as well as tone plans therefor are being considered for next-generation Wi-Fi. However, radio frequency (RF) design faces challenges such as direct-current (DC) leakage for wider bandwidths. Therefore, there is a need for a solution of center RU996 tone plan designs for wider bandwidths, such as 240 MHz, to relax the RF design challenges and to minimize performance degradation.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to center RU996 tone plan designs for wide bandwidth 240 MHz in wireless communications. For instance, under various proposed schemes in accordance with the present disclosure, several design options of center RU996 designs may be utilized or otherwise implemented to reserve more DC tones for 240 MHz to relax the RF design challenges and minimize performance degradation.

In one aspect, a method may involve generating at least one RU996. The method may also involve communicating wirelessly using the at least one RU996 in a 240 MHz bandwidth. The at least one RU996 may include a center RU996 that is centered around five or more DC tones.

In another aspect, an apparatus may include a transceiver configured to communicate wirelessly and a processor coupled to the transceiver. The processor may generate at least one RU996. The processor may also communicate wirelessly using the at least one RU996 in a 240 MHz bandwidth. The at least one RU996 may include a center RU996 that is centered around five or more DC tones.

It is noteworthy that, although description provided herein may be in the context of certain radio access technologies, networks and network topologies such as Wi-Fi and wireless local area network (WLAN) under pertinent Institute of Electrical and Electronics Engineers (IEEE) 802.11 standards, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 8 is a diagram of an example design in accordance with an implementation of the present disclosure.

FIG. 9 is a diagram of an example design in accordance with an implementation of the present disclosure.

FIG. 10 is a diagram of an example design in accordance with an implementation of the present disclosure.

FIG. 11 is a diagram of an example design in accordance with an implementation of the present disclosure.

FIG. 12 is a diagram of an example design in accordance with an implementation of the present disclosure.

FIG. 13 is a diagram of an example design in accordance with an implementation of the present disclosure.

FIG. 14 is a diagram of an example design in accordance with an implementation of the present disclosure.

FIG. 15 is a diagram of an example design in accordance with an implementation of the present disclosure.

FIG. 16 is a diagram of an example design in accordance with an implementation of the present disclosure.

FIG. 17 is a diagram of an example design in accordance with an implementation of the present disclosure.

DETAILED DESCRIPTION OF PREFERRED EMBODIMENTS

Figure 1:
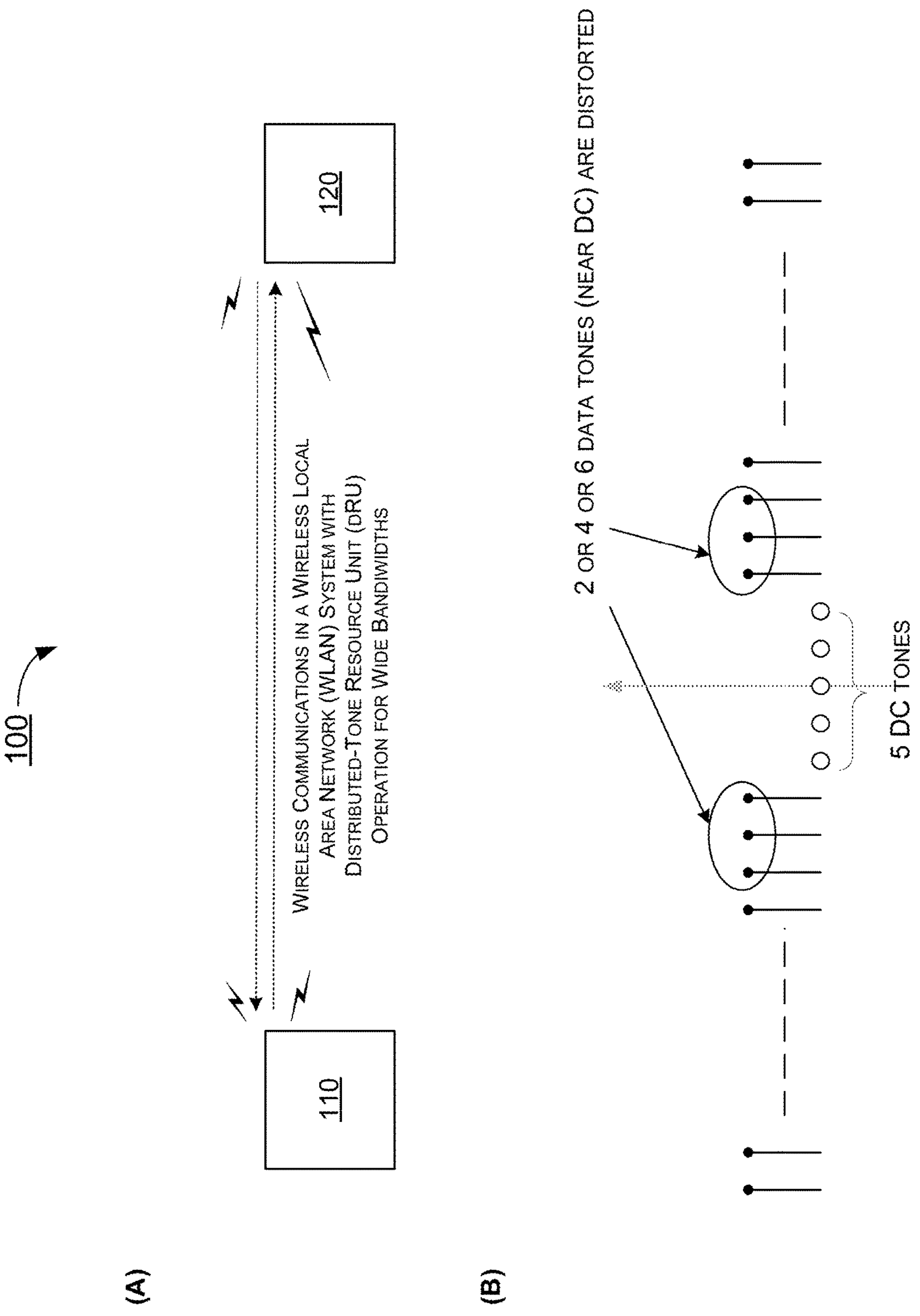
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to center RU996 tone plan designs for wide bandwidth 240 MHz in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is noteworthy that, in the present disclosure, a distributed-tone RU (dRU) refers to a RU with tones that are non-continuous (e.g., not adjacent to one another) and interleaved, interlaced or otherwise distributed. Moreover, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

It is further noteworthy that the terms "frequency segment", "segment", "frequency subblock" and "subblock" are used interchangeably in the present disclosure.

FIG. 1 illustrates an example network environment 100 in which various solutions and schemes in accordance with the present disclosure may be implemented. FIG. 2~FIG. 19 illustrate examples of implementation of various proposed schemes in network environment 100 in accordance with the present disclosure. The following description of various proposed schemes is provided with reference to FIG. 1~FIG. 19.

Referring to Part (A) of FIG. 1, network environment 100 may involve at least a first communication entity 110 (e.g., an access point (AP) station (STA) or a non-AP STA) communicating wirelessly with a second communication entity 120 (e.g., an AP STA or a non-AP STA). For simplicity, communication entity 110 and communication entity 120 may herein be interchangeably referred to as STA 110 and STA 120, respectively. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the various proposed schemes of center RU996 tone plan designs for wide bandwidth 240 MHz in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Part (B) of FIG. 1 shows an example of impact of tone distortion near DC tones. To evaluate performance impact of the number of DC tones, packet error rate (PER) performance simulation may be conducted with certain assumptions and conditions. For instance, it may be assumed that there are five DC tones for the center of a RU996. Also, the center RU996 may be considered as being scheduled to one user as a worst-case scenario. Moreover, the simulations may be run to check PER performance versus a number of distorted data tones near DC. In the simulations, two, four or six data tones may be punctured by assuming those near DC data tones are completely damaged or distorted. The simulation configurations may include the following: additive white Gaussian noise (AWGN) or direct non-ling of sight (D-NLOS), modulation and coding scheme (MCS) of MCS7, MCS11 or MCS13, one spatial stream (1ss) with one transmitter and one receiver (1 Tx & 1 Rx), ideal channel estimation, and low-density parity-check (LDPC) for error correction.

Figure 2:
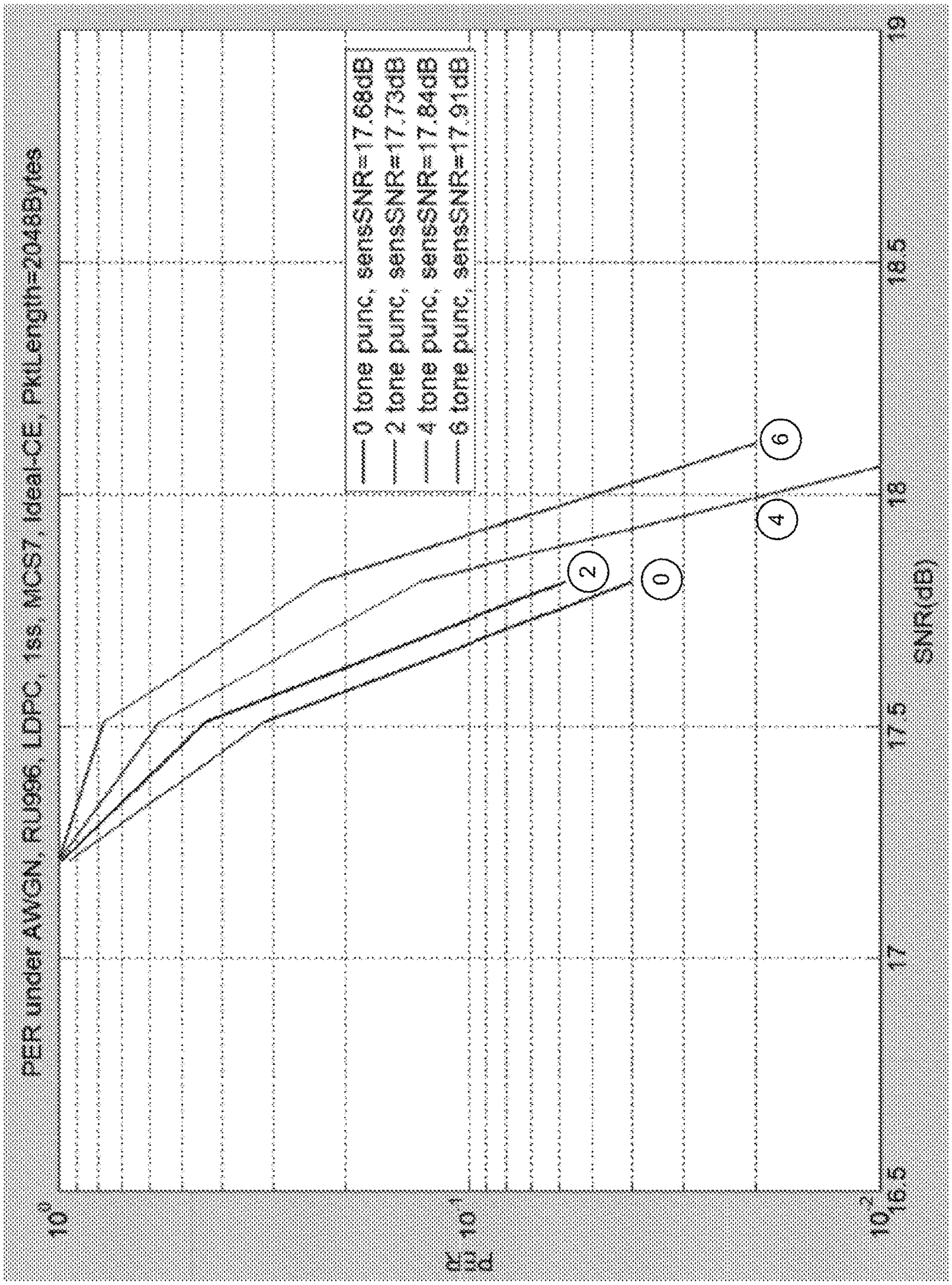
FIG. 2 is a diagram of an example scenario in accordance with an implementation of the present disclosure.

FIG. 2 illustrates an example scenario 200 under an implementation in accordance with the present disclosure. Scenario 200 may pertain to a simulation of impact of DC tones on PER performance, and the simulation may be conducted with MCS7 and AWGN. Referring to FIG. 2, performance loss=0.05 dB for two punctured tones, performance loss=0.16 dB for four punctured tones, and performance loss=0.23 dB for six punctured tones.

Figure 3:
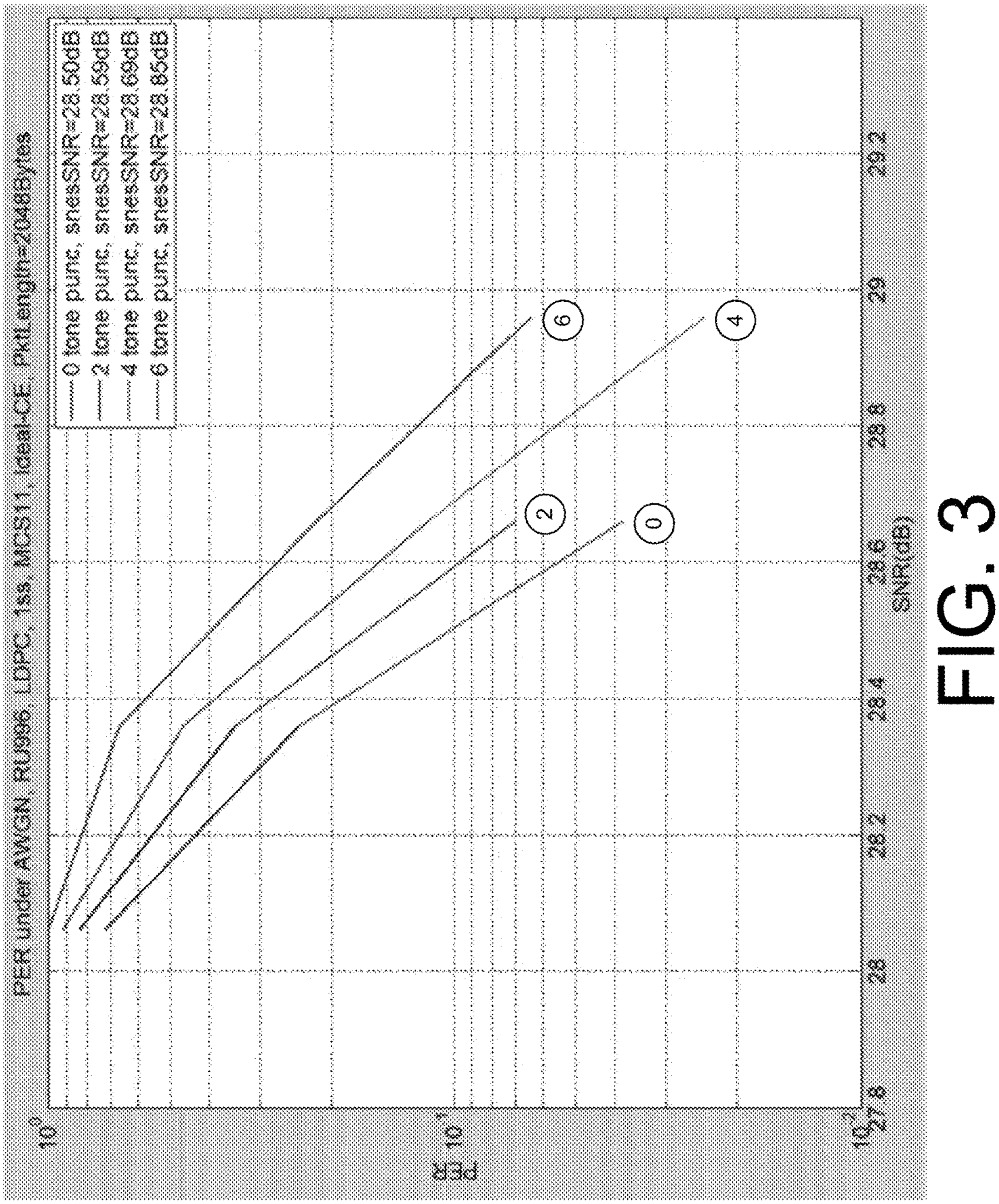
FIG. 3 is a diagram of an example scenario in accordance with an implementation of the present disclosure.

FIG. 3 illustrates an example scenario 300 under an implementation in accordance with the present disclosure. Scenario 300 may pertain to a simulation of impact of DC tones on PER performance, and the simulation may be conducted with MCS11 and AWGN. Referring to FIG. 3, performance loss=0.09 dB for two punctured tones, performance loss=0.19 dB for four punctured tones, and performance loss=0.35 dB for six punctured tones.

Figure 4:
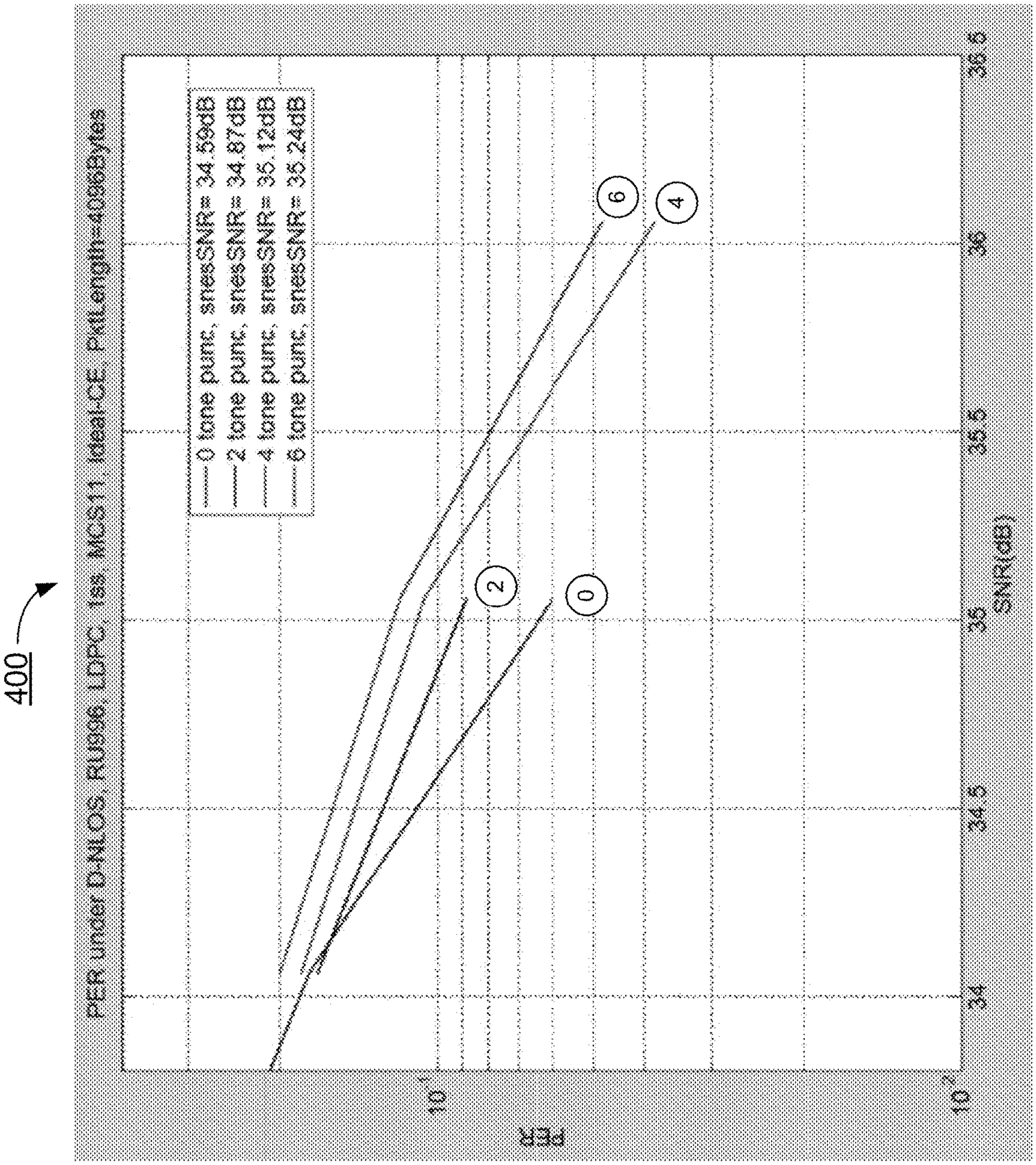
FIG. 4 is a diagram of an example scenario in accordance with an implementation of the present disclosure.

FIG. 4 illustrates an example scenario 400 under an implementation in accordance with the present disclosure. Scenario 400 may pertain to a simulation of impact of DC tones on PER performance, and the simulation may be conducted with MCS11 and D-NLOS. Referring to FIG. 4, performance loss=0.28 dB for two punctured tones, performance loss=0.53 dB for four punctured tones, and performance loss=0.65 dB for six punctured tones.

Figure 5:
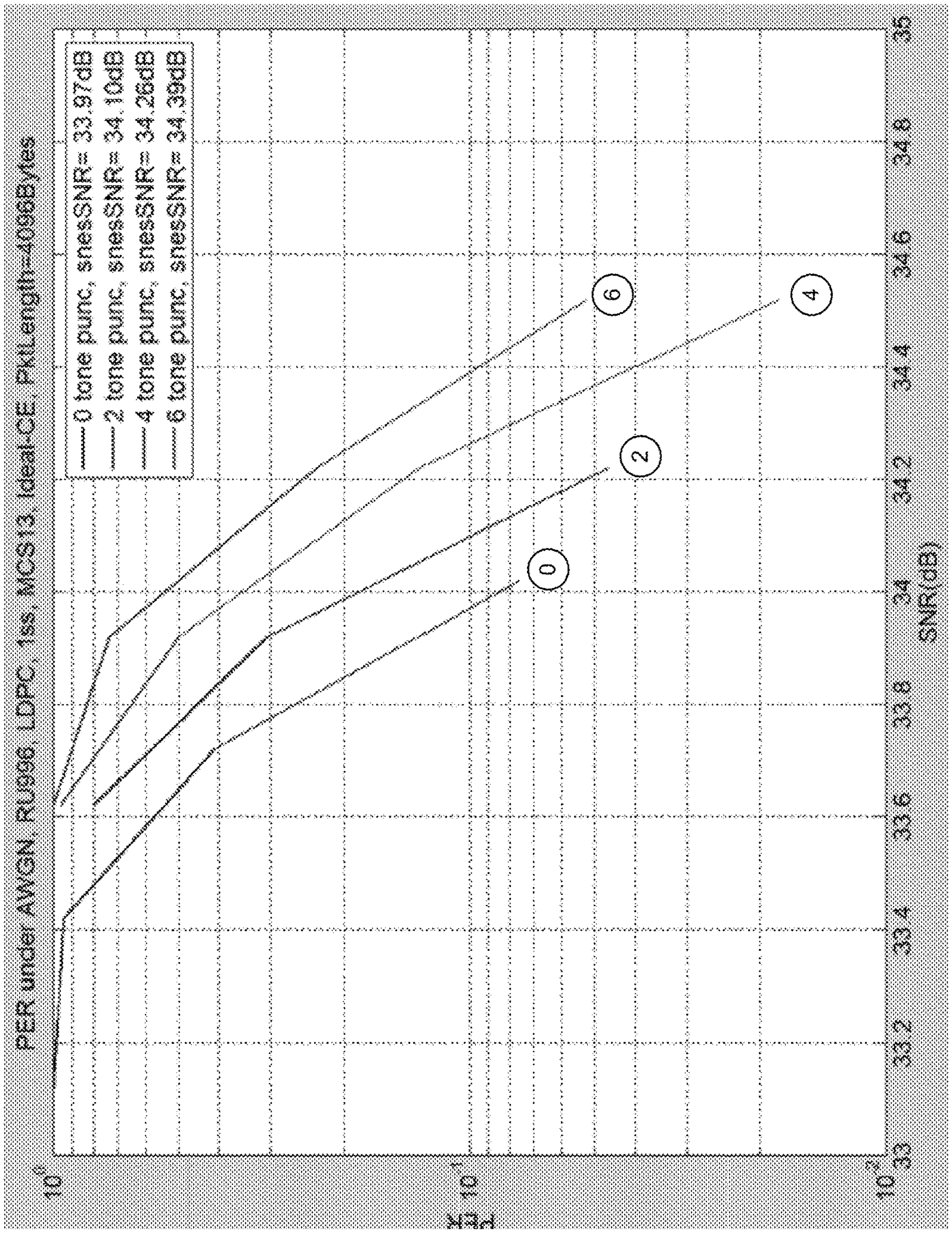
FIG. 5 is a diagram of an example scenario in accordance with an implementation of the present disclosure.

FIG. 5 illustrates an example scenario 500 under an implementation in accordance with the present disclosure. Scenario 500 may pertain to a simulation of impact of DC tones on PER performance, and the simulation may be conducted with MCS13 and AWGN. Referring to FIG. 5, performance loss=0.13 dB for two punctured tones, performance loss=0.29 dB for four punctured tones, and performance loss=0.42 dB for six punctured tones.

Under various proposed schemes in accordance with the present disclosure with respect to RU tone plan designs for BW240, it may be observed from the simulations (e.g., those the results of which are shown in FIG. 2~FIG. 5) that: (a) the damaged two or four or six data tones may be only about 0.2% or 0.4% or 0.6% of data tones in RU996, respectively; and (b) the performance degradation by puncturing two or four or six data tones may be up to 0.5 dB. Considering the spectral mask for punctured cases, and to facilitate simpler implementation, it may be better to keep all three RU996s (with one RU996 centered around the DC tones, another RU996 to the left thereof, and a third RU996 to the right side thereof) with the similar RU tone plan and with sufficient edge tones reserved. Yet, in order to relax the RF design for the DC leakage issue and to minimize performance degradation, the center RU996 tone plan design may be provided with minimal modifications as described below in various proposed schemes. It is also noteworthy that an AP and/or a STA may be allowed to configure its capability to support center RU996 and/or BW240 with five DC tones (or a different number of DC tones).

Figure 6:
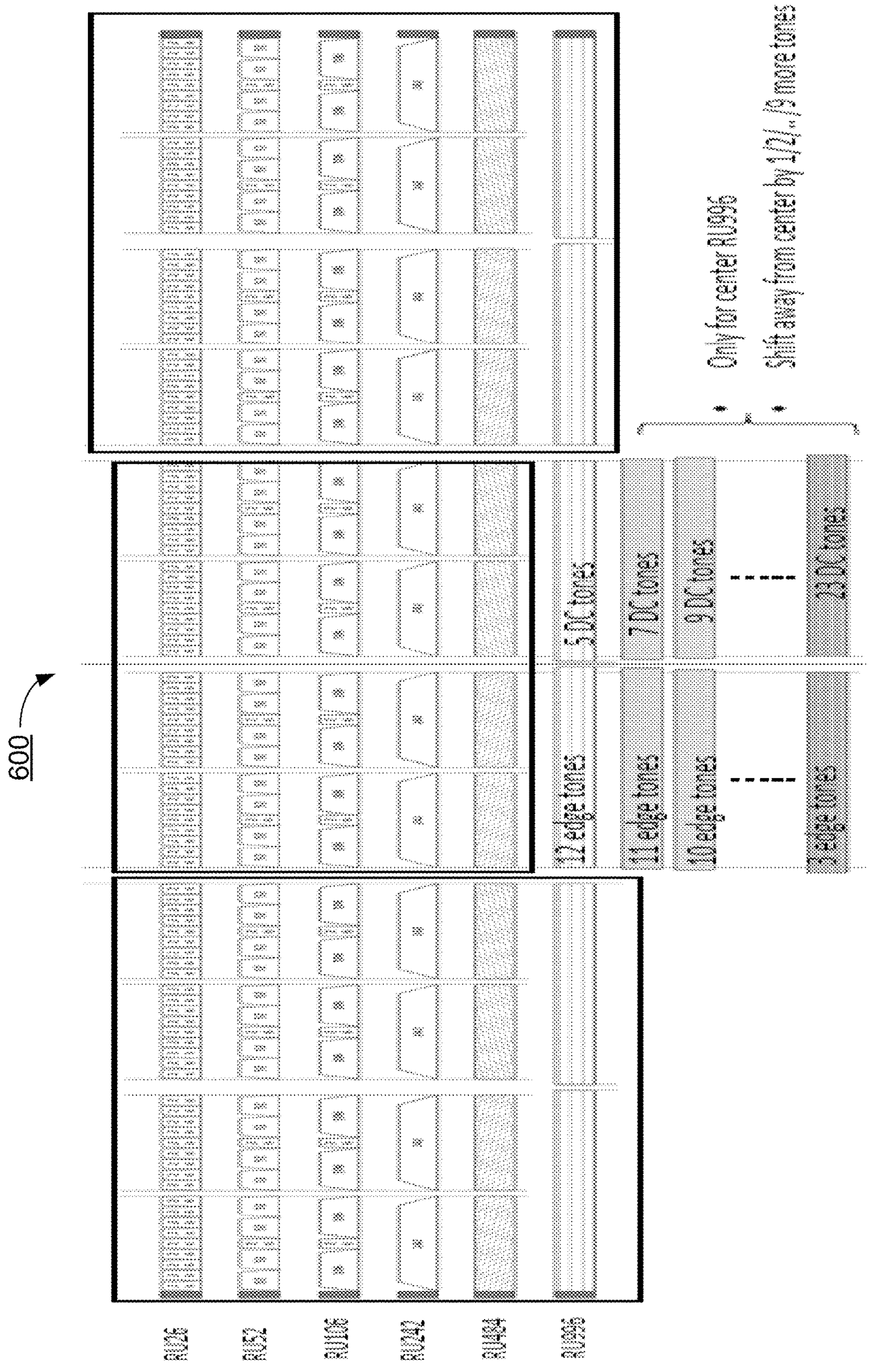
FIG. 6 is a diagram of an example scenario in accordance with an implementation of the present disclosure.

FIG. 6 illustrates an example scenario 600 under a proposed scheme in accordance with the present disclosure. Scenario 600 may pertain to a RU tone plan for BW240. Under the proposed scheme, RU26, RU52, RU106, RU242 and RU484 tone plan (including data tones and pilot tones) may be kept unchanged. Moreover, a first RU996 (or left-side RU996) and a third RU996 (or right-side RU996) may be kept unchanged, while a second RU996 (or center RU996) may be designed with several options by shifting a number of tones (e.g., in a range of 1-9) away from the center with indices of pilot tones unchanged.

Figure 7:
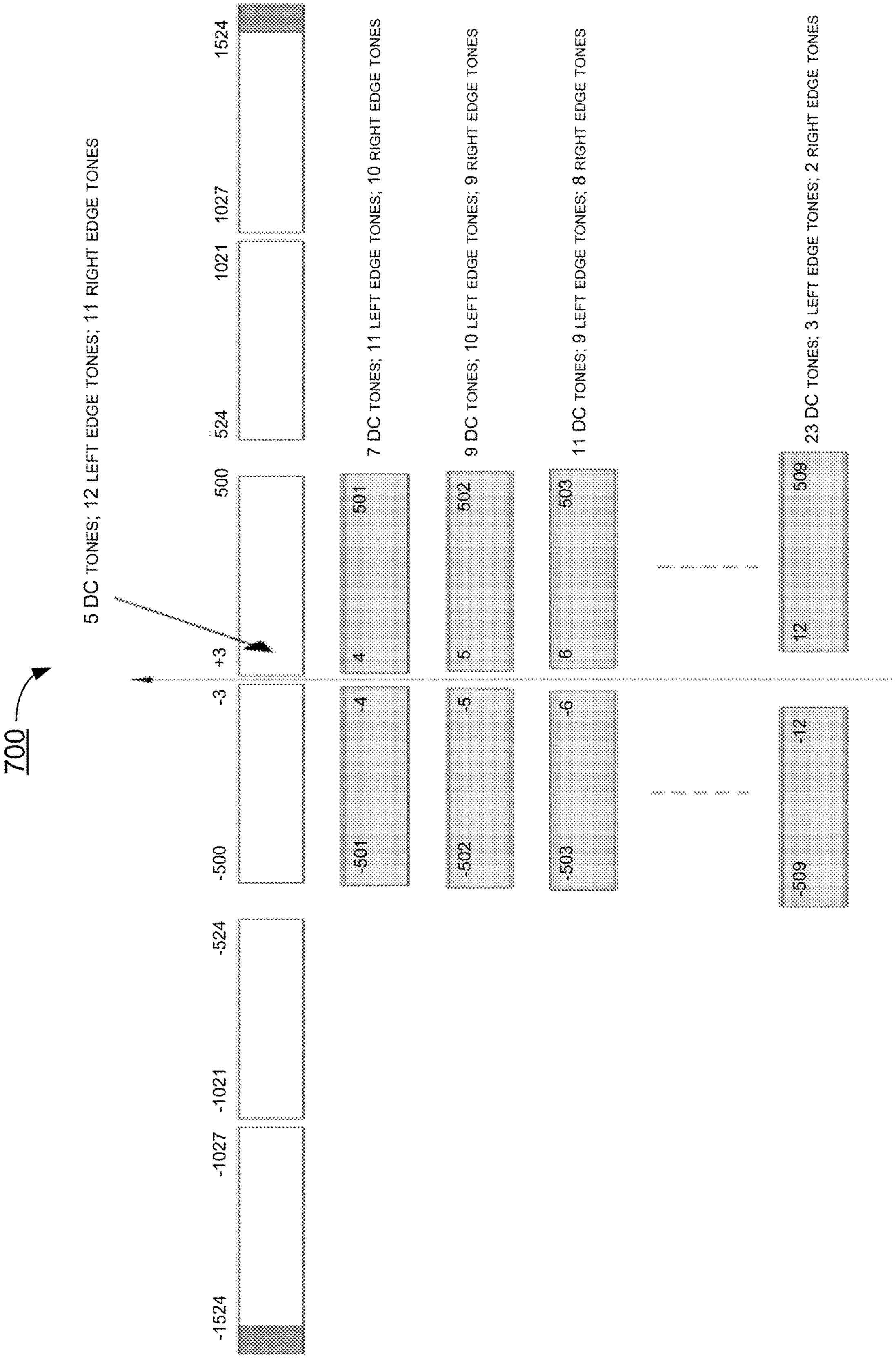
FIG. 7 is a diagram of an example scenario in accordance with an implementation of the present disclosure.

FIG. 7 illustrates an example scenario 700 under a proposed scheme in accordance with the present disclosure. Scenario 700 may pertain to reservation of more DC tones for center RU996. Under the proposed scheme, to reserve more DC tones for BW240, the center RU996 may be designed by shifting a number of tones (e.g., shift by 1, 2, 3, . . . , 9 tones) away from the center for both sides as shown in FIG. 7. For example, the top center "single 996-tone RU" in FIG. 7 has tone indices ranging from −501 to −3 and from +3 to 500, and it has 5 DC tones with tone indices of −2, −1, 0, 1, 2. Similarly, the second center "single 996-tone RU" in FIG. 7 has tone indices ranging from −501 to −4 and from +4 to 501, and it has 7 DC tones with tone indices of −3, −2, −1, 0, 1, 2, 3. Other center "single 996-tone RU" shown in FIG. 7 have even more DC tones. Moreover, FIG. 7 shows an example that there may additionally be a right RU996 (e.g., with tone indices of [524:1021, 1027:1524]) and a left RU996 (e.g., with tone indices of [−1524:−1027, −1021:−524]) to the right and left sides of the center RU996 (e.g., with tone indices of [−501:−3, 3:500]).

FIG. 8 illustrates an example design 800 under a proposed scheme in accordance with the present disclosure. Design 800 may pertain to a center RU996 design under a first option (Option-1). Referring to FIG. 8, there may be five DC tones for center RU996 or BW240 under Option-1.

FIG. 9 illustrates an example design 900 under a proposed scheme in accordance with the present disclosure. Design 900 may pertain to a center RU996 design under a second option (Option-2). Referring to FIG. 9, there may be seven DC tones for center RU996 or BW240 under Option-2.

FIG. 10 illustrates an example design 1000 under a proposed scheme in accordance with the present disclosure. Design 1000 may pertain to a center RU996 design under a third option (Option-3). Referring to FIG. 10, there may be nine DC tones for center RU996 or BW240 under Option-3.

FIG. 11 illustrates an example design 1100 under a proposed scheme in accordance with the present disclosure. Design 1100 may pertain to a center RU996 design under a fourth option (Option-4). Referring to FIG. 11, there may be eleven DC tones for center RU996 or BW240 under Option-4.

FIG. 12 illustrates an example design 1200 under a proposed scheme in accordance with the present disclosure. Design 1200 may pertain to a center RU996 design under a fifth option (Option-5). Referring to FIG. 12, there may be thirteen DC tones for center RU996 or BW240 under Option-5.

FIG. 13 illustrates an example design 1300 under a proposed scheme in accordance with the present disclosure. Design 1300 may pertain to a center RU996 design under a sixth option (Option-6). Referring to FIG. 13, there may be fifteen DC tones for center RU996 or BW240 under Option-6.

FIG. 14 illustrates an example design 1400 under a proposed scheme in accordance with the present disclosure. Design 1400 may pertain to a center RU996 design under a seventh option (Option-7). Referring to FIG. 14, there may be seventeen DC tones for center RU996 or BW240 under Option-7.

FIG. 15 illustrates an example design 1500 under a proposed scheme in accordance with the present disclosure. Design 1500 may pertain to a center RU996 design under an eighth option (Option-8). Referring to FIG. 15, there may be nineteen DC tones for center RU996 or BW240 under Option-8.

FIG. 16 illustrates an example design 1600 under a proposed scheme in accordance with the present disclosure. Design 1600 may pertain to a center RU996 design under a ninth option (Option-9). Referring to FIG. 16, there may be twenty-one DC tones for center RU996 or BW240 under Option-9.

FIG. 17 illustrates an example design 1700 under a proposed scheme in accordance with the present disclosure.

Design 1700 may pertain to a center RU996 design under a tenth option (Option-10). Referring to FIG. 17, there may be twenty-three DC tones for center RU996 or BW240 under Option-10.

ILLUSTRATIVE IMPLEMENTATIONS

Figure 18:
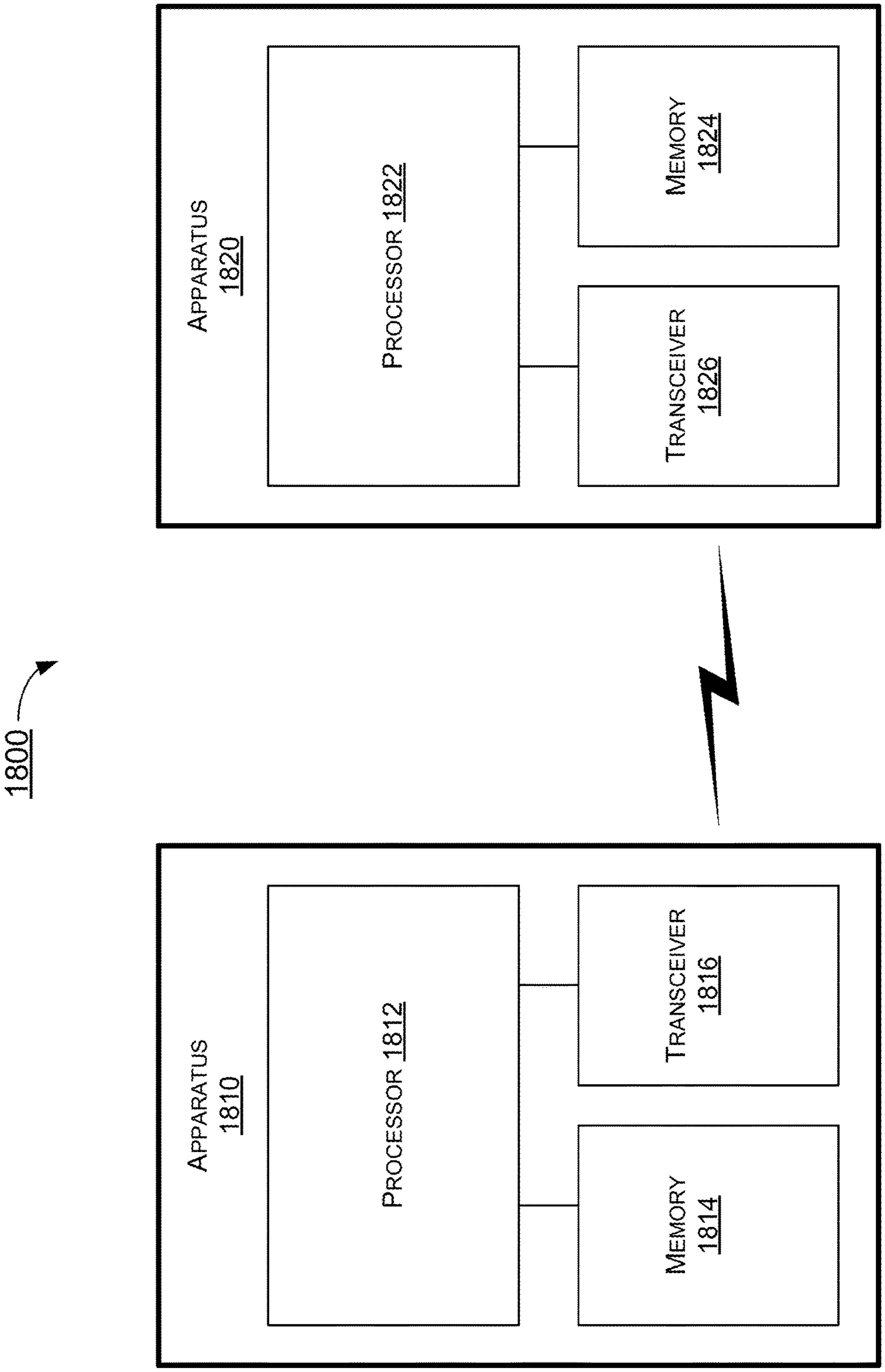
FIG. 18 is a block diagram of an example communication system in accordance with an implementation of the present disclosure.

FIG. 18 illustrates an example system 1800 having at least an example apparatus 1810 and an example apparatus 1820 in accordance with an implementation of the present disclosure. Each of apparatus 1810 and apparatus 1820 may perform various functions to implement schemes, techniques, processes and methods described herein pertaining to center RU996 tone plan designs for wide bandwidth 240 MHz in wireless communications, including the various schemes described above with respect to various proposed designs, concepts, schemes, systems and methods described above as well as processes described below. For instance, apparatus 1810 may be an example implementation of communication entity 110, and apparatus 1820 may be an example implementation of communication entity 120.

Each of apparatus 1810 and apparatus 1820 may be a part of an electronic apparatus, which may be a STA or an AP, such as a portable or mobile apparatus, a wearable apparatus, a wireless communication apparatus or a computing apparatus. For instance, each of apparatus 1810 and apparatus 1820 may be implemented in a smartphone, a smart watch, a personal digital assistant, a digital camera, or a computing equipment such as a tablet computer, a laptop computer or a notebook computer. Each of apparatus 1810 and apparatus 1820 may also be a part of a machine type apparatus, which may be an IoT apparatus such as an immobile or a stationary apparatus, a home apparatus, a wire communication apparatus or a computing apparatus. For instance, each of apparatus 1810 and apparatus 1820 may be implemented in a smart thermostat, a smart fridge, a smart door lock, a wireless speaker or a home control center. When implemented in or as a network apparatus, apparatus 1810 and/or apparatus 1820 may be implemented in a network node, such as an AP in a WLAN.

In some implementations, each of apparatus 1810 and apparatus 1820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1810 and apparatus 1820 may be implemented in or as a STA or an AP. Each of apparatus 1810 and apparatus 1820 may include at least some of those components shown in FIG. 18 such as a processor 1812 and a processor 1822, respectively, for example. Each of apparatus 1810 and apparatus 1820 may further include one or more other components not pertinent to the proposed scheme of the present disclosure (e.g., internal power supply, display device and/or user interface device), and, thus, such component(s) of apparatus 1810 and apparatus 1820 are neither shown in FIG. 18 nor described below in the interest of simplicity and brevity.

In one aspect, each of processor 1812 and processor 1822 may be implemented in the form of one or more single-core processors, one or more multi-core processors, one or more RISC processors or one or more CISC processors. That is, even though a singular term "a processor" is used herein to refer to processor 1812 and processor 1822, each of processor 1812 and processor 1822 may include multiple processors in some implementations and a single processor in other implementations in accordance with the present disclosure. In another aspect, each of processor 1812 and processor 1822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1812 and processor 1822 is a special-purpose machine specifically designed, arranged and configured to perform specific tasks including those pertaining to center RU996 tone plan designs for wide bandwidth 240 MHz in wireless communications in accordance with various implementations of the present disclosure. For instance, each of processor 1812 and processor 1822 may be configured with hardware components, or circuitry, implementing one, some or all of the examples described and illustrated herein.

In some implementations, apparatus 1810 may also include a transceiver 1816 coupled to processor 1812. Transceiver 1816 may be capable of wirelessly transmitting and receiving data. In some implementations, apparatus 1820 may also include a transceiver 1826 coupled to processor 1822. Transceiver 1826 may include a transceiver capable of wirelessly transmitting and receiving data.

In some implementations, apparatus 1810 may further include a memory 1814 coupled to processor 1812 and capable of being accessed by processor 1812 and storing data therein. In some implementations, apparatus 1820 may further include a memory 1824 coupled to processor 1822 and capable of being accessed by processor 1822 and storing data therein. Each of memory 1814 and memory 1824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1814 and memory 1824 may include a type of read-only memory (ROM) such as mask ROM, programmable ROM (PROM), erasable programmable ROM (EPROM) and/or electrically erasable programmable ROM (EEPROM). Alternatively, or additionally, each of memory 1814 and memory 1824 may include a type of non-volatile random-access memory (NVRAM) such as flash memory, solid-state memory, ferroelectric RAM (FeRAM), magnetoresistive RAM (MRAM) and/or phase-change memory.

Each of apparatus 1810 and apparatus 1820 may be a communication entity capable of communicating with each other using various proposed schemes in accordance with the present disclosure. For illustrative purposes and without limitation, a description of capabilities of apparatus 1810, as STA 110, and apparatus 1820, as STA 120, is provided below in the context of example process 1900. It is noteworthy that, although a detailed description of capabilities, functionalities and/or technical features of apparatus 1820 is provided below, the same may be applied to apparatus 1810 although a detailed description thereof is not provided solely in the interest of brevity. It is also noteworthy that, although the example implementations described below are provided in the context of WLAN, the same may be implemented in other types of networks.

Illustrative Processes

Figure 19:
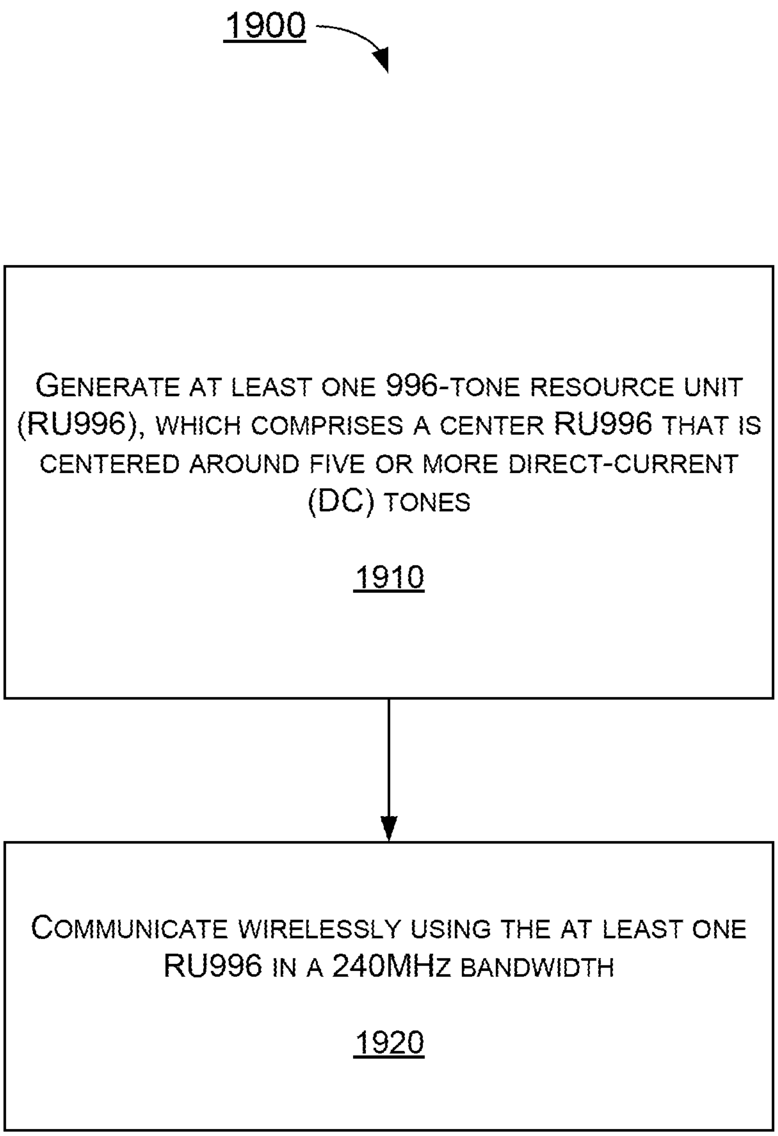
FIG. 19 is a flowchart of an example process in accordance with an implementation of the present disclosure.

FIG. 19 illustrates an example process 1900 in accordance with an implementation of the present disclosure. Process 1900 may represent an aspect of implementing various proposed designs, concepts, schemes, systems and methods described above. More specifically, process 1900 may represent an aspect of the proposed concepts and schemes pertaining to center RU996 tone plan designs for wide bandwidth 240 MHz in wireless communications in accordance with the present disclosure. Process 1900 may include one or more operations, actions, or functions as illustrated by one or more of blocks 1910 and 1920. Although illustrated as discrete blocks, various blocks of process 1900 may be divided into additional blocks, combined into fewer blocks, or eliminated, depending on the desired implementation. Moreover, the blocks/sub-blocks of process 1900 may be executed in the order shown in FIG. 19 or, alternatively, in a different order. Furthermore, one or more of the blocks/sub-blocks of process 1900 may be executed repeatedly or iteratively. Process 1900 may be implemented by or in apparatus 1810 and apparatus 1820 as well as any variations thereof. Solely for illustrative purposes and without limiting the scope, process 1900 is described below in the context of apparatus 1810 as communication entity 110 (e.g., a transmitting device whether a STA or an AP) and apparatus 1820 as communication entity 120 (e.g., a receiving device whether a STA or an AP) of a wireless network such as a WLAN in accordance with one or more of IEEE 802.11 standards. Process 1900 may begin at block 1910.

At 1910, process 1900 may involve processor 1812 of apparatus 1810 generating at least one RU996. The at least one RU996 may include a center RU996 that is centered around five or more DC tones. Process 1900 may proceed from 1910 to 1920.

At 1920, process 1900 may involve processor 1812 communicating wirelessly, via transceiver 1816, using the at least one RU996 in a 240 MHz bandwidth.

In some implementations, the five or more DC tones may include five DC tones. Moreover, the at least one RU996 may include: (a) a single 3×996-tone RU with a tone index and subcarrier range as [−1524:−1027, −1021:−524, −501:−3, 3:500, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−501:−3, 3:500] for RU2; and [524:1021, 1027:1524] for RU3.

In some implementations, the five or more DC tones may include seven DC tones. Moreover, the at least one RU996 may include: (a) a single 3×996-tone RU with a tone index and subcarrier range as [−1524:−1027, −1021:−524, −501:−4, 4:501, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021; −524] for RU1; [−501:−4, 4:501] for RU2; and [524:1021, 1027:1524] for RU3.

In some implementations, the five or more DC tones may include nine DC tones. Moreover, the at least one RU996 may include: (a) a single 3×996-tone RU with a tone index and subcarrier range as [−1524:−1027, −1021:−524, −502:−5, 5:502, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−502:−5, 5:502] for RU2; and [524:1021, 1027:1524] for RU3.

In some implementations, the five or more DC tones may include eleven DC tones. Moreover, the at least one RU996 may include: (a) a single 3×996-tone RU with a tone index and subcarrier range as [−1524:−1027, −1021:−524, −503:−6, 6:503, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−503:−6, 6:503] for RU2; and [524:1021, 1027:1524] for RU3.

In some implementations, the five or more DC tones may include thirteen DC tones. Moreover, the at least one RU996 may include: (a) a single 3×996-tone RU with a tone index and subcarrier range as [−1524:−1027, −1021:−524, −504:−7, 7:504, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−504:−7, 7:504] for RU2; and [524:1021, 1027:1524] for RU3.

In some implementations, the five or more DC tones may include fifteen DC tones. Moreover, the at least one RU996 may include: (a) a single 3×996-tone RU with a tone index and subcarrier range as [−1524:−1027, −1021:−524, −505:−8, 8:505, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−505:−8, 8:505] for RU2; and [524:1021, 1027:1524] for RU3.

In some implementations, the five or more DC tones may include seventeen DC tones. Moreover, the at least one RU996 may include: (a) a single 3×996-tone RU with a tone index and subcarrier range as [−1524:−1027, −1021:−524, −506:−9, 9:506, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−506:−9, 9:506] for RU2; and [524:1021, 1027:1524] for RU3.

In some implementations, the five or more DC tones may include nineteen DC tones. Moreover, the at least one RU996 may include: (a) a single 3×996-tone RU with a tone index and subcarrier range as [−1524:−1027, −1021:−524, −507:−10, 10:507, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−507:−10, 10:507] for RU2; and [524:1021, 1027:1524] for RU3.

In some implementations, the five or more DC tones may include twenty-one DC tones. Moreover, the at least one RU996 may include: (a) a single 3×996-tone RU with a tone index and subcarrier range as [−1524:−1027, −1021:−524, −508:−11, 11:508, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−508:−11, 11:508] for RU2; and [524:1021, 1027:1524] for RU3.

In some implementations, the five or more DC tones may include twenty-three DC tones. Moreover, the at least one RU996 may include: (a) a single 3×996-tone RU with a tone index and subcarrier range as [−1524:−1027, −1021:−524, −509:−12, 12:509, 524:1021, 1027:1524]; or (b) three 996-tone RUs comprising a first 996-tone RU (RU1), a second 996-tone RU (RU2) and a third 996-tone RU (RU3) with respective tone index and subcarrier ranges as: [−1524:−1027, −1021:−524] for RU1; [−509:−12, 12:509] for RU2; and [524:1021, 1027:1524] for RU3.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating at least one 996-tone resource unit (RU996); and communicating wirelessly using the at least one RU996 in a 240 MHz bandwidth, wherein the at least one RU996 comprises three 996-tone RUs that comprise: a center RU996 that is centered around seven or more direct-current (DC) tones, and a left RU996 and a right RU996 to left and right sides of the center RU996, respectively, wherein the left RU996 is centered around five null tones [−1026:−1022] and the right RU996 is centered around five null tones [1022:1026]; or wherein the at least one RU996 comprises a single 3×996-tone RU that has a center subcarrier block that is centered around seven or more DC tones, a left subcarrier block and a right subcarrier block to left and right sides of the center subcarrier block, respectively, wherein the left subcarrier block of the single 3×996-tone RU is centered around the five null tones [−1026:−1022] and the right subcarrier block of the single 3×996-tone RU is centered around the five null tones [1022:1026].

2. The method of claim 1, wherein the seven or more DC tones comprise seven DC tones, and wherein the at least one RU996 comprises:

the single 3×996-tone RU with a tone index and subcarrier range as [−1524:−1027, −1021:−524, −501:−4, 4:501, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−501:−4, 4:501] for RU2; and

[524:1021, 1027:1524] for RU3.

3. The method of claim 1, wherein the seven or more DC tones comprise nine DC tones, and wherein the at least one RU996 comprises:

the single 3×996-tone RU with a tone index and subcarrier range as [−1524:−1027, −1021:−524, −502:−5, 5:502, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−502:−5, 5:502] for RU2; and

[524:1021, 1027:1524] for RU3.

4. The method of claim 1, wherein the seven or more DC tones comprise eleven DC tones, and wherein the at least one RU996 comprises:

the single 3×996-tone RU with a tone index and subcarrier range as [−1524:−1027, −1021:−524, −503:−6, 6:503, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−503:−6, 6:503] for RU2; and

[524:1021, 1027:1524] for RU3.

5. The method of claim 1, wherein the seven or more DC tones comprise thirteen DC tones, and wherein the at least one RU996 comprises:

the single 3×996-tone RU with a tone index and subcarrier range as [−1524:−1027, −1021:−524, −504:−7, 7:504, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−504:−7, 7:504] for RU2; and

[524:1021, 1027:1524] for RU3.

6. The method of claim 1, wherein the seven or more DC tones comprise fifteen DC tones, and wherein the at least one RU996 comprises:

the single 3×996-tone RU with a tone index and subcarrier range as [−1524:−1027, −1021:−524, −505:−8, 8:505, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−505:−8, 8:505] for RU2; and

[524:1021, 1027:1524] for RU3.

7. The method of claim 1, wherein the seven or more DC tones comprise seventeen DC tones, and wherein the at least one RU996 comprises:

the single 3×996-tone RU with a tone index and subcarrier range as [−1524:−1027, −1021:−524, −506:−9, 9:506, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−506:−9, 9:506] for RU2; and

[524:1021, 1027:1524] for RU3.

8. The method of claim 1, wherein the seven or more DC tones comprise nineteen DC tones, and wherein the at least one RU996 comprises:

the single 3×996-tone RU with a tone index and subcarrier range as [−1524:−1027, −1021:−524, −507:−10, 10:507, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−507:−10, 10:507] for RU2; and

[524:1021, 1027:1524] for RU3.

9. The method of claim 1, wherein the seven or more DC tones comprise twenty-one DC tones, and wherein the at least one RU996 comprises:

the single 3×996-tone RU with a tone index and subcarrier range as [−1524:−1027, −1021:−524, −508:−11, 11:508, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−508:−11, 11:508] for RU2; and

[524:1021, 1027:1524] for RU3.

10. The method of claim 1, wherein the seven or more DC tones comprise twenty-three DC tones, and wherein the at least one RU996 comprises:

the single 3×996-tone RU with a tone index and subcarrier range as [−1524:−1027, −1021:−524, −509:−12, 12:509, 524:1021, 1027:1524]; or the three 996-tone RUs comprising the first 996-tone RU (RU1), the second 996-tone RU (RU2) and the third 996-tone RU (RU3) with respective tone index and subcarrier ranges as:

[−1524:−1027, −1021:−524] for RU1;

[−509:−12, 12:509] for RU2; and

[524:1021, 1027:1524] for RU3.

11. An apparatus, comprising:

a transceiver configured to communicate wirelessly; and a processor coupled to the transceiver and configured to perform operations comprising:

generating at least one 996-tone resource unit (RU996); and communicating wirelessly, via the transceiver, using the at least one RU996 in a 240 MHz bandwidth, wherein the at least one RU996 comprises three 996-tone RUs that comprise: a center RU996 that is centered around seven or more direct-current (DC) tones, and a left RU996 and a right RU996 to left and right sides of the center RU996, respectively, wherein the left RU996 is centered around five null tones [−1026:−1022] and the right RU996 is centered around five null tones [1022:1026]; or wherein the at least one RU996 comprises a single 3×996-tone RU that has a center subcarrier block that is centered around seven or more DC tones, a left subcarrier block and a right subcarrier block to left and right sides of the center subcarrier block, respectively, wherein the left subcarrier block of the single 3×996-tone RU is centered around the five null tones [−1026:−1022] and the right subcarrier block of the single 3×996-tone RU is centered around the null tones [1022:1026].

12. The apparatus of claim 11, wherein the seven or more DC tones comprise seven DC tones, and wherein the at least one RU996 comprises:

the single 3×996-tone RU with a tone index and subcarrier range as [−1524:−1027, −1021:−524, −501:−4, 4:501, 524:1021, 1027:1524]; or the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−501:−4, 4:501] for RU2; and
[524:1021, 1027:1524] for RU3.

13. The apparatus of claim 11, wherein the seven or more DC tones comprise nine DC tones, and wherein the at least one RU996 comprises:
the single 3×996-tone RU with a tone index and subcarrier range as [−1524:−1027, −1021:−524, −502:−5, 5:502, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−502:−5, 5:502] for RU2; and
[524:1021, 1027:1524] for RU3.

14. The apparatus of claim 11, wherein the seven or more DC tones comprise eleven DC tones, and wherein the at least one RU996 comprises:
the single 3×996-tone RU with a tone index and subcarrier range as [−1524:−1027, −1021:−524, −503:−6, 6:503, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−503:−6, 6:503] for RU2; and
[524:1021, 1027:1524] for RU3.

15. The apparatus of claim 11, wherein the seven or more DC tones comprise thirteen DC tones, and wherein the at least one RU996 comprises:
the single 3×996-tone RU with a tone index and subcarrier range as [−1524:−1027, −1021:−524, −504:−7, 7:504, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−504:−7, 7:504] for RU2; and
[524:1021, 1027:1524] for RU3.

16. The apparatus of claim 11, wherein the seven or more DC tones comprise fifteen DC tones, and wherein the at least one RU996 comprises:
the single 3×996-tone RU with a tone index and subcarrier range as [−1524:−1027, −1021:−524, −505:−8, 8:505, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−505:−8, 8:505] for RU2; and
[524:1021, 1027:1524] for RU3.

17. The apparatus of claim 11, wherein the seven or more DC tones comprise seventeen DC tones, and wherein the at least one RU996 comprises:
the single 3×996-tone RU with a tone index and subcarrier range as [−1524:−1027, −1021:−524, −506:−9, 9:506, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−506:−9, 9:506] for RU2; and
[524:1021, 1027:1524] for RU3.

18. The apparatus of claim 11, wherein the seven or more DC tones comprise nineteen DC tones, and wherein the at least one RU996 comprises:
the single 3×996-tone RU with a tone index and subcarrier range as [−1524:−1027, −1021:−524, −507:−10, 10:507, 524:1021, 1027:1524]; or
the three 996-tone RUs comprising the first 996-tone RU (RU1 the a second 996-tone RU (RU2) and the third 996-tone RU (RU3) with respective tone index and subcarrier ranges as:
[−1524:−1027, −1021:−524] for RU1;
[−507:−10, 10:507] for RU2; and
[524:1021, 1027:1524] for RU3.

19. The apparatus of claim 11, wherein the seven or more DC tones comprise twenty-one DC tones, and wherein the at least one RU996 comprises:
the single 3×996-tone RU with a tone index and subcarrier range as [−1524:−1027, −1021:−524, −508:−11, 11:508, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−508:−11, 11:508] for RU2; and
[524:1021, 1027:1524] for RU3.

20. The apparatus of claim 11, wherein the seven or more DC tones comprise twenty-three DC tones, and wherein the at least one RU996 comprises:
the single 3×996-tone RU with a tone index and subcarrier range as [−1524:−1027, −1021:−524, −509:−12, 12:509, 524:1021, 1027:1524]; or
the three 996-tone RUs comprising the first 996-tone RU (RU1), the second 996-tone RU (RU2) and the third 996-tone RU (RU3) with respective tone index and subcarrier ranges as:
[−1524:−1027, −1021:−524] for RU1;
[−509:−12, 12:509] for RU2; and
[524:1021, 1027:1524] for RU3.

* * * * *